(12) United States Patent
Sasaki

(10) Patent No.: US 6,573,972 B2
(45) Date of Patent: Jun. 3, 2003

(54) LCD PANEL AND METHOD OF FABRICATING SAME

(75) Inventor: Takeshi Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/735,806

(22) Filed: Dec. 14, 2000

(65) Prior Publication Data

US 2001/0004281 A1 Jun. 21, 2001

(30) Foreign Application Priority Data

Dec. 14, 2000 (JP) .......................................... 11-355197

(51) Int. Cl.$^7$ ........................ G02F 1/1339; G02F 1/161
(52) U.S. Cl. ........................ 349/190; 349/153; 349/154
(58) Field of Search .................................. 349/113, 114, 349/117, 112, 188, 61, 190; 427/600; 428/1; 523/523

(56) References Cited

U.S. PATENT DOCUMENTS

| | | | | |
|---|---|---|---|---|
| 5,335,103 A | * | 8/1994 | Kim ............................... | 359/8 |
| 5,637,630 A | * | 6/1997 | Atkins ......................... | 523/523 |
| 5,978,065 A | * | 11/1999 | Kawasumi et al. ......... | 349/188 |
| 6,051,289 A | * | 4/2000 | Tsujimoto et al. ............. | 428/1 |

FOREIGN PATENT DOCUMENTS

| | | |
|---|---|---|
| JP | 59-171925 | 9/1984 |
| JP | 64-54420 | 3/1989 |
| JP | 3-273215 | 12/1991 |
| JP | 6-73164 | 3/1994 |
| JP | 8-106101 | 4/1996 |
| JP | 11-326922 | 11/1999 |
| WO | WO98/18043 | 4/1998 |
| WO | WO99/47969 | 9/1999 |

OTHER PUBLICATIONS

Japanese Office Action dated May 14, 2002 with partial English translation.
Korean Office Action dated Jun. 28, 2002 with partial English translation.

* cited by examiner

Primary Examiner—William L. Sikes
Assistant Examiner—P. R. Akkapeddi
(74) Attorney, Agent, or Firm—McGinn & Gibb, PLLC

(57) ABSTRACT

A method of fabricating an LCD Panel includes providing a first transparent substrate, providing a second transparent substrate, forming a first sealing member on the first transparent substrate to surround a display area, the first sealing member being used for sealing a liquid crystal, the first sealing member having a first closed pattern, forming a second sealing member on the first or second substrate to surround the first sealing member, the second sealing member having a second closed patter; dropping a liquid crystal on the first or second substrate in the display area, coupling the first and second substrates with each other to form a gap between the first and second substrates in a vacuum atmosphere, forming a closed inner space between the first and second substrates by the first and second sealing members, the liquid crystal being confined in the inner space; curing the second sealing member; and curing the first sealing member.

21 Claims, 8 Drawing Sheets

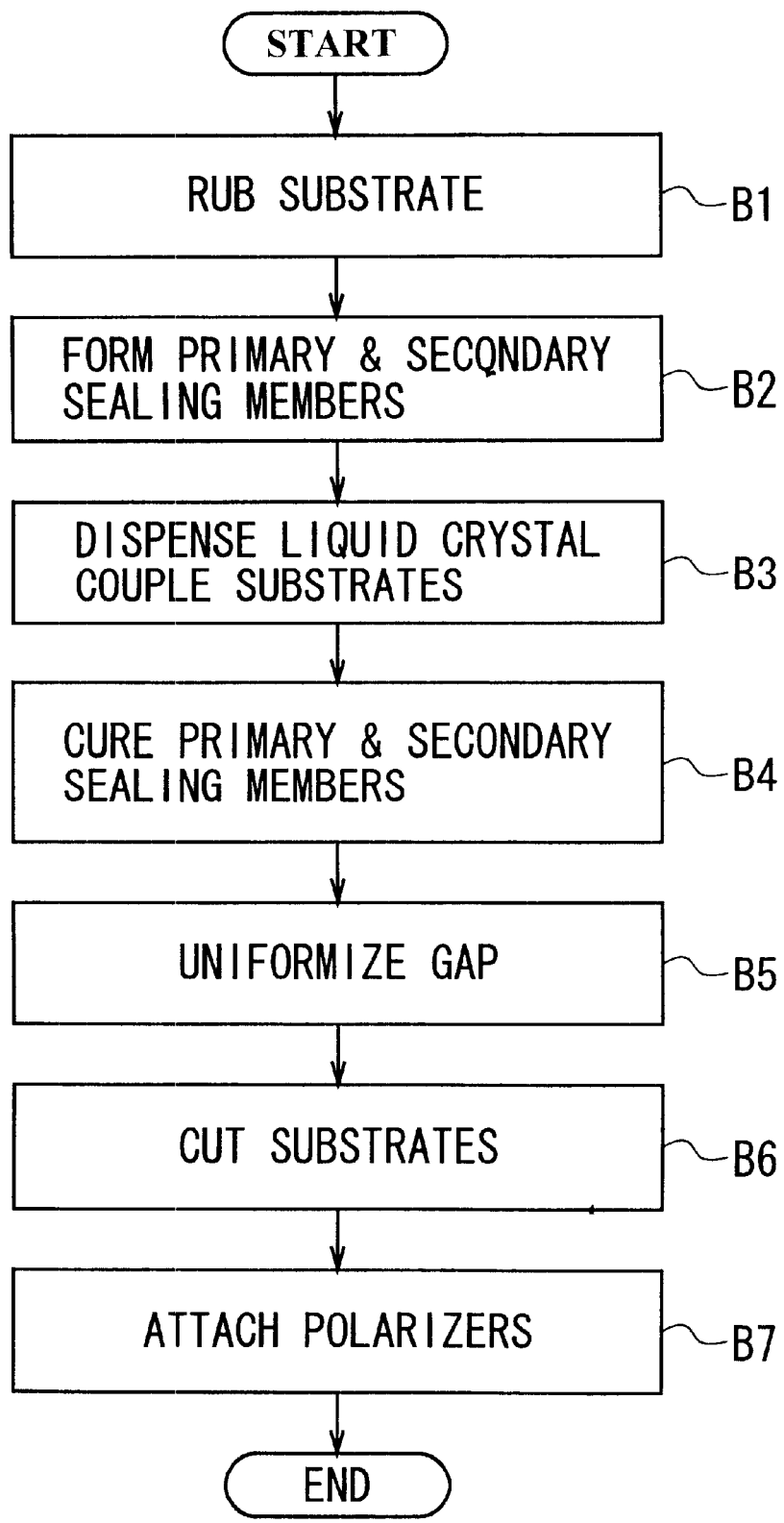

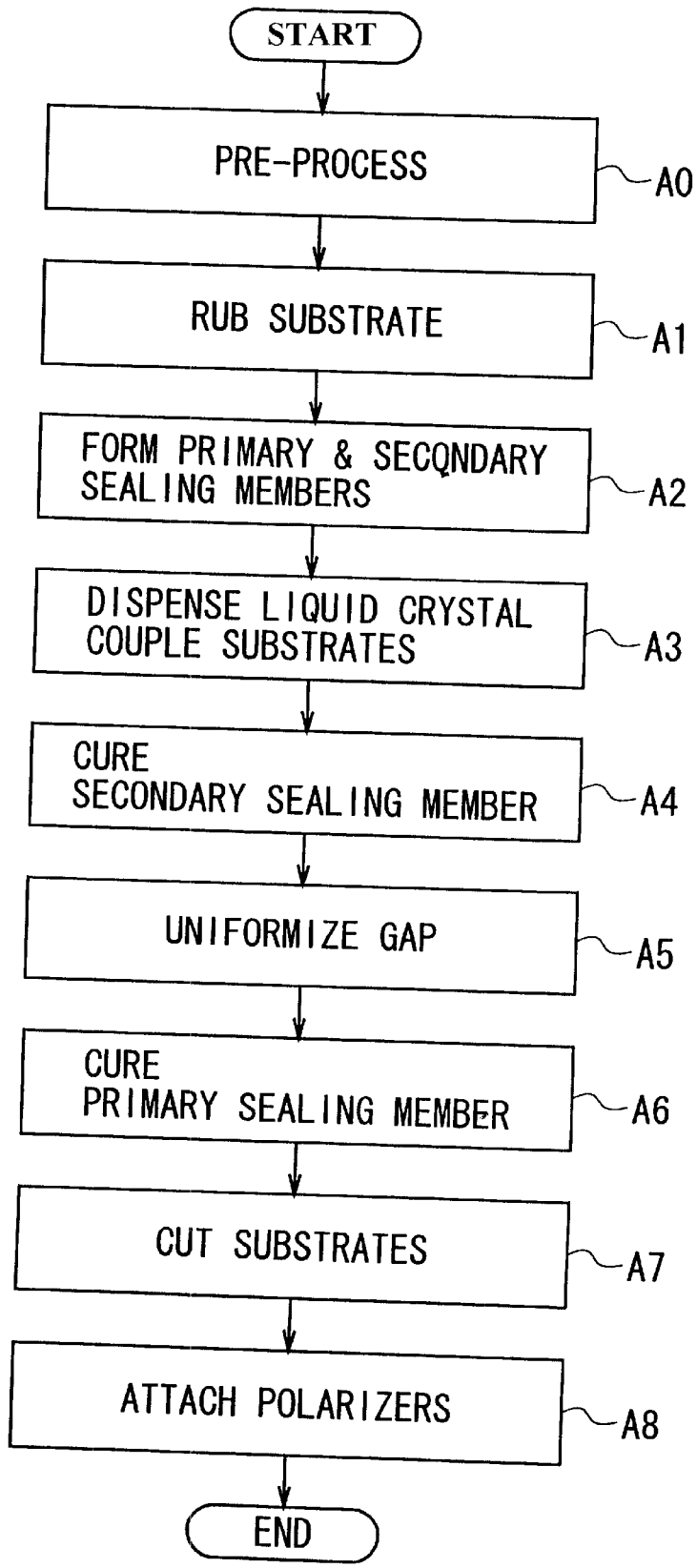

US 6,573,972 B2

LCD PANEL AND METHOD OF FABRICATING SAME

BACKGROUND OF THE INVENTION

1. Field of the Invention

The present invention relates to a Liquid-Crystal Display (LCD) panel and a method of fabricating the same and more particularly, to a LCD panel that provides a substantially uniform cell gap between opposing substrates and that displays images with excellent quality over the whole display area, and a method of fabricating the panel.

2. Description of the Prior Art

A LCD panel generally has a configuration including a pair of transparent, opposed substrates (e.g., glass substrates) fixed at a specific gap, a frame-shaped sealing member located between the substrates to couple the substrates with each other so as to form an inner space therebetween, spacer particles dispersed in the space to keep the gap, and a liquid crystal filled in the space.

With the LCD panels of the active-matrix addressing type, typically, Thin-Film Transistors (TFTs) are formed on one of the pair of substrates and a color filter is formed on the other. Usually, the substrate with TFTS is termed the "TFT array substrate" while the substrate with a color filter is termed the "color filter substrate".

Conventionally, to fill the inner space between the substrates with liquid crystal, the "substrate dipping process" and the "liquid crystal dispensing process" have been developed and used practically. The substrate dipping process was developed in early days and has ever been used in practice and thus, the technique for performing the substrate dipping process has been diversified On the other hand, the liquid crystal dispensing process was developed in recent years and has been getting popular. However, the technique for performing the liquid crystal dispensing process has not been diversified compared with the substrate dipping process. Thus, there is the demand to grow or expand this technique.

With both the first and second methods of fabricating the LCD panel using the substrate dipping process and the liquid crystal dispensing process, the same process steps are carried out in their early stages. For example, in the patterning process, necessary parts or elements (e.g., dielectric layers, transparent electrodes, switching elements or devices, and color filter layers) are formed on the respective substrates. In the rubbing process subsequent to the patterning process, alignment layers (e.g., polyimide layers) are formed by printing on the inner surfaces of the substrates and then, the layers are rubbed to form grooves extending in the same direction or different directions for orientating the liquid crystal molecules toward a specific direction or directions. The following process steps are different in the fabrication methods using the dipping and dispensing methods.

FIGS. 1 and FIGS. 2A to 2C show the LCD panel fabrication method using the substrate dipping process, which may be termed the first prior-art method later.

After the rubbing process C1 as explained above, the sealing member formation process C2 is carried out. In this process C2, as shown in FIG. 2A, two frame-shaped sealing members 132 are formed on the inner surface of a lower transparent substrate 131 at a specific distance. Each of the members 132 is used for the LCD panel. The member 132 is continuously written to draw a rectangular frame on the substrate 131 by dispensing a material for the sealing member 132 from the nozzle of a known dispenser. A proper epoxy-system thermosetting resin is used for the member 132. Needless to say, the member 132 may be formed by the known screen printing method.

As shown in FIG. 2A, the frame-shaped sealing member 132 has a pattern of an approximately rectangular closed curve with an opening 133. The member 132 is formed to surround the display area 114, in other words, the member 132 extends around the periphery of the area 114. The opening 133 is used as an inlet through which liquid crystal is injected into the inside of the member 132.

After the sealing member formation process C2, the substrate coupling process C3 is carried out In this process, another transparent substrate (not shown, an upper transparent substrate), is overlaid the lower substrate 131 so as to overlap entirely with each other, forming a substrate assembly. At this time, each cell on the lower substrate 131 is opposed to the corresponding cell on the upper substrate.

Thereafter, a pressure is applied to the substrate assembly with a pressing plate, setting the gap between the lower and upper substrates at a desired value.

If spacer particles are used for keeping the gap between the substrates, they are spayed or arranged on the inner surface of the lower substrate 131 in the display area 114 surrounded by the sealing member 132 prior to the substrate coupling process C3.

Subsequent to the substrate coupling process C3, the sealing member curing process C4 is carried out. In this process, the sealing member 132 is cured with the heater provided on the pressing plate. This process C4 may be carried out by placing the substrate pair in an oven and by heating the atmosphere in the oven up to a specific temperature.

Thereafter, the substrate cutting process C5 is carried out. In this process, the substrate pair or substrate assembly is cut to divide it into LCD panel assemblies 100. The cutting operation of the substrate pair is performed along the cutting line that surrounds each sealing member 132, forming a rectangular-ring-shaped specific area outside the display area 114 in each panel assembly 100. The assembly 100 thus divided is shown in FIG. 2B.

In the method explained here, two panel assemblies 100 are produced from the substrate pair. The way to form a plurality of panel areas in the same substrate pair like this has been extensively performed in practice, because it is advantageous to raising the productivity.

Typically, the position of the cutting line is set in such a way that the cutting line involves a necessary module or unit including the driver circuit which will be provided on the lower substrate 131 outside the sealing member 132 in a subsequent process.

After the substrate cutting process C5, the liquid crystal injecting process C6 is performed, which utilizes typically a vacuum atmosphere. In this case, the panel assembly 100 is placed in a vacuum chamber of a specific vacuum apparatus at an atmospheric pressure. Next, the air in the chamber is evacuated and then, the assembly 100 is dipped into a liquid crystal stored in the container so that the inlet 133 of the assembly 100 is immersed in the crystal. Thereafter, the pressure in the chamber is raised gradually toward the atmospheric pressure, thereby injecting the crystal into the inner space of the assembly 100 due to the pressure difference between the inner space and the outside.

In the process C6 utilizing a vacuum atmosphere, the liquid crystal can be injected into the space of the panel assembly 100 until the pressure difference between the inner space and the outside is equal to zero. Typically, it takes about 10 hours to fill the inner space of the assembly 10 with the liquid crystal.

Subsequent to the liquid crystal injecting process C6, the inlet closing or blocking process C7 is performed. In this process, as shown in FIG. 2C, a thermosetting blocking material 134 (e.g., thermosetting epoxy resin) is attached to the inlet 133 ant then, the material 134 is heated to be cured. Thus, the inlet 133 is blocked by the material 134. At this time, a proper pressure may be applied to the panel assembly 100 under control to generate a force drawing the material 134 into the space. This is to ensure the blocking of the inlet 133 by the material 134.

The liquid crystal thus injected into the inner space and filling the same forms a liquid crystal layer 115 between the two substrates.

In the polarizer plate attaching process C8, a polarizer plate (not shown) is attached to the outer surface of each of the lower and upper substrate. The polarizer plate is provided to allow the component of light whose plane of polarization is in a specific direction to selectively pass through. The plates on the two substrates are fixed in such a way that their polarization directions are perpendicular.

Through the above-described process steps, the LCD panel 100a is completed, as shown in FIG. 2C.

FIGS. 3, and FIGS. 4A and 4C show the LCD panel fabrication method using the liquid crystal dispensing process, in which a primary or main sealing member for sealing a liquid crystal and a secondary or auxiliary sealing member for keeping the inner space between the substrates at a specific vacuum condition are used. This method may be termed the second prior-art method later.

After the rubbing process B1 which is the same as the process A1 as explained above, the sealing member formation process B2 is carried out. In this process B2, as shown in FIG. 4A, two frame-shaped primary sealing members 220 are formed on a lower transparent substrate 201 at a specific distance. Also, a frame-shaped secondary sealing member 212 is formed on the substrate 201 to surround the two members 220 at a specific distance. The primary members 220 may be formed on the lower substrate 201 while the secondary member 212 may be formed on another substrate (i.e., an upper substrate).

Each of the primary members 220 is used for the LCD panel. Each of the primary members 220 and the secondary member 212 is continuously written to draw a rectangular frame on the substrate 131 by dispensing a material for the sealing member 220 and 212 from the nozzle of a known dispenser. A proper acrylic-system ultraviolet (UV)-curing resin is used for the members 220 and 212. Needless to say, the members 220 and 212 may be formed by the known screen printing method.

As shown in FIG. 4A, each of the frame-shaped primary sealing members 220 has a pattern of an approximately rectangular closed curve without any opening. The member 220 is formed to surround the display area 214, in other words, the member 220 extends around the periphery of the area 214. On the other hand, the frame-shaped secondary sealing members 212 has a pattern of an approximately rectangular closed curve without any opening. The member 212 is formed to involve the primary members 220 and to extend along the periphery of the substrate 201. As seen from the explanation and FIG. 4A, no inlet for injecting a liquid crystal is provided on the substrate 201. This is unlike the previously-explained first method using the substrate dipping process shown in FIGS. 1 and FIGS. 2A to 2C.

After the sealing member formation process B2, the liquid crystal dispensing and substrate coupling process B3 is carried out. In this process, unlike the previously-explained first method using the substrate dipping process, a liquid crystal is dispensed on the inner surface of the lower substrate 201 prior to coupling the substrates.

The assembly apparatus used for this purpose comprises typically a pressuring mechanism and an evacuating mechanism.

The pressuring mechanism includes an upper surface plate movable vertically and a lower surface plate movable horizontally. When the assembly of the lower and upper substrates is located between the lower and upper surface plates, it may be applied with a pressure as desired. The lower plate is larger in size than the upper plate and thus, the peripheral area of the lower plate protrudes from the upper plate when the upper plate is placed on the lower plate.

The evacuating mechanism has a lid formed by a top wall and a side wall extending along the periphery of the top wall, forming an inner space. The bottom of the lid is open. The upper surface plate of the pressuring mechanism is located in the inner space of the lid. When the lid along with the upper surface plate is lowered toward the lower surface plate of the pressuring mechanism until the opening lower end of the lid contacts closely the protruding periphery of the lower surface plate, a closed space is formed in the lid. The closed space, which is sandwiched by the lower and upper surface plates in the lid, communicates with a pumping system by way of tubes.

The upper surface plate is movable vertically with respect to the lid and therefore, the distance between the upper and lower surface plates is changeable. Thus, the pressure applied to the substrate assembly in the closed space is adjustable minutely.

The liquid crystal dispensing and substrate coupling process B3 is carried out in the following way using the above-described assembly apparatus.

First, the upper substrate 202 is attached to the upper surface plate of the assembly apparatus by suction while the lower substrate 201 is attached to the lower surface plate thereof by suction. Next, a liquid crystal is dropped in the display areas 214 of the lower substrate 201 which is surrounded by the respective primary sealing members 220.

Thereafter, the lower plate is slid to the position just below the upper plate and aligned thereto. The upper plate is lowered to be overlaid on the lower substrate 201 and then, the lid is lowered, contacting closely the bottom end of the lid with ok the periphery of the lower plate. Thus, the closed space is formed between the upper and lower plates.

Following this, the air existing in the closed space thus formed is evacuated by the evacuating mechanism, forming a vacuum atmosphere that surrounds the lower and upper substrates 201 and 202. The pressing force of the upper plate to the lower plate is raised to apply a pressure to the upper substrate 202. Thus, the gap 205 between the lower and upper substrate 201 and 202 is minutely adjusted as desired.

Through the above-described processes, the lower substrate 201 is coupled with the upper substrate 202 by way of the primary and secondary sealing members 220 and 212, forming a liquid crystal layer 215 in the gap 205. In other words, a LCD panel assembly 200 comprising the lower and upper substrates 201 and 202, the sealing members 220 and 212, and the liquid crystal layer 215 is produced. The state at this stage is shown in FIG. 4B.

Subsequently, the applied pressure to the upper plate is removed and then, the lower plate on which the LCD panel assembly 200 is placed is slid outwardly from the overlaying position. The assembly 200 is subjected to a diselectrification process and then, taken out of the assembly apparatus and sent to the subsequent sealing member curing process B4.

In the sealing member curing process B4, the sealing members 220 and 212 are cured by irradiating specific UV light to the members 220 and 212. This process is performed in 30 minutes after the space that surrounds the assembly 200 has been released to the atmospheric pressure.

Next, the gap uniformizing process B5 is carried out. The uniformization of the gap 205 between the lower and upper substrates 201 and 202 coupled together progresses due to the pressing force caused by the difference between the atmospheric pressure applied to the outer surfaces of the panel assembly 200 and the inner pressure thereof. Specifically, due to the deformation of the lower and upper substrate 201 and 202 and the deformation of the liquid crystal layer 215 in the gap 205, the gap 205 is uniformized gradually if spacer particles are dispersed in the gap 205, the particles are deformed by the pressing force as well, resulting in the gap 205 being uniformized.

Even after the pressure difference between the atmospheric pressure and the inner pressure of the panel assembly 200 decreases during the gap uniformizing process, the vacuum space 221 formed between the primary sealing members 220 and the secondary sealing member 212 tends to keep the pressure difference unchanged. Therefore, after the assembly 200 is left in the atmospheric pressure, the uniformizing process B5 of the gap 205 continues until the pressing force generated by the atmospheric pressure balances the stress of the assembly 200.

If the primary and secondary sealing members 220 and 212 are left uncured after the panel assembly 200 is left in the atmospheric pressure, the secondary sealing member 212 tends to break. In this case, the vacuum space 221 tends to disappear and as a result, the gap uniformization does not progress at desired high level. At the same time, due to the break of the secondary sealing member 212, there is a danger that the atmospheric pressure applies directly to the primary sealing member 220, resulting in the member 220 itself being broken. Accordingly, as described above, the time to start the curing process is set in 30 minutes after the space that surrounds the assembly 200 has been released to the atmospheric pressure, thereby setting the gap uniformizing period to overlap with the periods before and after the curing process.

After the gap uniformizing process B5, the substrate cutting process B6 is Performed. In this process, the panel assembly 200 is cut to divide it into LCD panels 200a (see Figs. 5A and 5B). The cutting operation of the panel assembly 200 is performed along the cutting line that surrounds each primary sealing member 220, forming a rectangular-ring-shaped specific area outside the display area 114 in each panel 200a. The panel 200a thus divided is shown in FIGS. 5A and 5B. Thus, the LCD panel 200a is produced.

Typically, the position of the cutting line is set in such a way that the cutting line involves a necessary module or unit including the driver circuit which will be provided on the lower substrate 201 outside the primary sealing member 220 in a subsequent process.

After the substrate cutting process B6, the polarizer plate attaching process B7 is carried out. In this process, a polarizer plate (not shown) is attached to the outer surface of each of the lower and upper substrate 201 and 202 of each LCD panel 200a. The polarizer plate is provided to allow the component of light whose plane of polarization is in a specific direction to selectively pass through. The plates on the two substrates are fixed in such a way that their polarization directions are perpendicular.

Through the above-described process steps, the LCD panel 200a is completed. As seen from the above explanation, the liquid crystal injection and inlet blocking processes are unnecessary and thus, there is an advantage that the overall process time is decreased compared with the method using the liquid crystal injection process.

With the second method using the liquid crystal dispensing process, the gap uniformizing process B5 is performed after curing the primary sealing members 220. Thus, the deformation of the members 220 follow sufficiently the deformation of the lower and upper substrates 201 and 202 and thus, some dimensional difference occurs between the gap in the periphery of the display area 214 (i.e., the vicinity of the primary sealing member 220) and the gap at the center of the area 214. As a result, there arises a problem that the gap is nonuniform in the entire area 214.

For example, as shown in FIG. 5A, the gap g2 in the vicinity of the primary sealing member 220 is greater than the gap g1 in the center of the area 214 (i.e., g2>g1). Alternately, as shown in FIG. 5B, the gap g2 is less than the gap g1 (i.e., g2<g1). As a result, in the periphery of the area 214 (i.e., in the vicinity of the member 220), the gap varies (i.e., decreases or increases) from the member 220 to the center of the area 214. If the gap change becomes excessively large, concentric interference fringes occur in the periphery of the area 214.

The interference fringes occur due to the following principle.

As shown in FIG. 6, a pair of transparent substrates 71 and 72 are placed to be opposed to each other, where the gap between the substrates 71 and 72 varies. If monochromic incident light with a wavelength of $\lambda$ enters the pair of substrates 71 and 72, a light beam reflected by the inner surface of the substrate 71 and a light beam reflected by the inner surface of the substrate 72 interferes. Although other reflected light beams are present and they may interfere, they are omitted for simplification of discussion here.

If the gap is uniform (i.e., d1=d2=d3), the interference state are equal in the whole substrates 71 and 72 and as a result, no bright and dark fringe appears. However, the gap is nonuniform as shown in FIG. 6, some bright and dark interference fringes appear according to the gap change.

The condition of the interference fringes seems that the fringes are formed at the positions where the gap difference is equal to ($\lambda/2$). The reason of this is explained below.

First, the gap at the first bright part B1 is defined as d1 while the gap at the second bright part B2 next to the part B1 is defined as d2. In this case, the difference between the optical path lengths at the parts B1 and B2 is given as 2(d2−d1), because the light beam goes and returns between the substrates 71 and 72.

The first and second bright conditions are established when the difference between the optical path lengths at the parts B1 and B2 is equal to the wavelength $\lambda$, i.e., $\lambda=2(d2-d1)$. Thus, the gap difference at the parts B1 and B2 is given as $(d2-d1)=\lambda/2$.

Usually, the wavelength $\lambda$ of the incident light is approximately 500 to 550 nm (i.e., 0.5 to 0.55 $\mu$m) and thus, the gap difference at the parts B1 and B2 is approximately 0.25 $\mu$m.

Practically, the gap between the substrates 71 and 72 is filled with a liquid crystal. Thus, the light propagating in the crystal has a wavelength of λ/n, where n is the refractive index of the crystal. As a result, (d2−d1)=λ/2n is established.

For example, if the refractive index n of the crystal is 1.4 (i.e., n=1.4) and the wavelength λ of the incident light (green light) is 550 nm (λ=550 nm), the gap difference is given as (d2−d1)=λ/2n=550/(1.4×2)=196 nm≈0.2 µm.

With the second prior-art method with the liquid crystal dispensing process, the gap difference as large as 0.2 µm occurs frequently. Thus, the concentric interference fringes are formed and as a result, the display quality degrades.

Moreover, with the second prior-art method using the liquid crystal dispensing process, there is the following problem about the material of the primary sealing members 220.

Specifically, in this method, thermosetting resins have been used for the sealing members 220 for a long time. At present, various kinds of thermosetting resins are available for this purpose and therefore, an optimum thermosetting resin is selectable as desired. For example, a thermosetting resin with a less contamination property to a specific liquid crystal to be used is available for the members 220.

Also, since no UV light is used, there is no possibility that the liquid crystal and/or the orientation layers degrade in the fabrication process sequence. However, the thermosetting resins used for this purpose are low in viscosity and therefore, they tend to have a long curing time.

Furthermore, unlike this, with the first prior-art method using the substrate dipping process, the pressure of the atmosphere surrounding the panel 100 does rot vary prior to the sealing member curing process C4. Thus, there is no possibility that the pressing force is applied to the uncured sealing member due to the atmospheric pressure.

With the second prior-art method using the liquid crystal dispensing process, it is essential that the atmospheric pressure is applied to the uncured sealing members 220 and 212 in the sealing member curing and substrate coupling process B4. This means that the material for the members 220 and 212 needs to have a Viscosity that withstand the force due to the atmospheric pressure and a short curing time that allows the material for the members 220 and 212 to cure before the members 220 and 212 break due to the force. It is difficult to find or select the material satisfying these two requirements. As a result, UV curing resins are usually used for the members 220 and 212.

If UV curing resins are used, there arises a problem that the liquid crystal and the alignment layers tend to degrade due to irradiation of UV light.

Also, UV curing resins available to sealing members 220 and 212 have been used in practice in recent years. Thus, only a few resins of this type are available for this purpose. For example, there is a case where only one resin of this type is accessible for the practical purpose. Accordingly, UV curing a, resins, which are higher in contamination property to the liquid crystal than thermosetting resins, are essentially selected.

To decrease the contamination level to liquid crystal, there is a problem that the contamination level of UV curing resins to liquid crystal needs to be improved in the future. Also, it is essential to use UV curing resins in spite of their bad contamination property to liquid crystal.

With the first prior-art method using the substrate dipping process, since a thermosetting resin is used for the sealing members 132, there is an advantage about the contamination level to liquid crystal. However, as explained previously, there is a problem that the injection time of liquid crystal is long. There is another problem that the connection part of the inlet 133 of the member 132 to the blocking member 134 tends to be applied with stress concentration, resulting in the member 134 being broken.

In addition, from the viewpoint of shortening the overall process time, the second prior-art method using the liquid crystal dispensing process tend to be used extensively instead of the first prior-art method using the substrate dipping process.

SUMMARY OF THE INVENTION

Accordingly, an object of the present invention is to provide an LCD panel and a method of fabricating the panel that form a uniform gap between a pair of substrates over the whole display area.

Another object of the present invention is to provide an LCD panel and a method of fabricating the panel that provide high display quality.

A still another object of the present invention is to provide an LCD panel and a method of fabricating the panel that decreases the contamination level to liquid crystal of sealing material.

A further object of the present invention is to provide an LCD panel and a method of fabricating the panel that prevent liquid crystal and alignment layers from degrading due to UV light irradiation.

A still further object of the present invention is to provide an LCD panel and a method of fabricating the panel that decrease the time for uniformizing the gap between he substrates.

A still further object of the present invention is to provide an LCD panel and a method of fabricating the panel that improves the strength of the sealing members against stress concentration.

The above objects together with others not specifically mentioned will become clear to those skilled in the art from the following description.

According to a first aspect of the present invention, a method of fabricating an LCD panel is provided, which comprises the steps of:

(a) providing a first transparent substrate;

(b) providing a second transparent substrate;

(c) forming a first sealing member on the first transparent substrate to surround a display area;
the first sealing member being used for sealing a liquid crystal;
the first sealing member having a first closed pattern;

(d) forming a second sealing member on the first or second substrate to surround the first sealing member;
the second sealing member having a second closed pattern;

(e) dropping a liquid crystal on the first or second substrate in the display area;

(f) coupling the first and second substrates with each other to form a gap between the first and second substrates in a vacuum atmosphere, forming a closed inner space between the first and second substrates by the first and second sealing members;
the liquid crystal being confined in the inner space;

(g) curing the second sealing member after the step (f); and (h) curing the first sealing member after the step (f).
The steps (g) and (h) are performed at different times from each other.

With the method fabricating an LCD panel according to the first aspect of the present invention, the second substrate is coupled with the first substrate and then, the second sealing member is cured and subsequently, the first sealing member is cured. In other words, the time for curing the second sealing member is apart from the time for curing the first sealing member.

Since the second sealing member is cured prior to the first sealing member, the inside of the coupled substrates is kept at a vacuum state, thereby preventing the first sealing member from being applied directly with the atmospheric pressure. Thus, there is no need to use a high viscosity material enough to withstand the atmospheric pressure for the first sealing member and to cure the first sealing member promptly not to be broken due to application of the atmospheric pressure. In other words, a low viscosity material can be used for the first sealing member and at the same time, the first sealing member can be kept uncured for a desired period of time.

Also, the second sealing member can be cured after the first and second substrate are coupled together. Thus, the vacuum level in the inner space of the coupled first and second substrates can be kept for a long time. In other words, if the coupled first and second substrates are left in the atmospheric pressure after the second sealing member is cured, the first and second substrates can be pressed sufficiently by the atmospheric pressure after the second sealing member is cured, the first and second substrates can be pressed sufficiently by the atmospheric pressure. Accordingly, if the coupled first and second substrate are left in the atmospheric pressure to uniformize the gap between the coupled first and second substrates after the second sealing member is cured, almost all the gap uniformizing process can be conducted in the state where the first sealing member is not cured. In this case, the first sealing member can deform according to the deformation of the coupled first and second substrates, in other words, the deformation of the first and second substrates is not restricted by the height of the cured first sealing member. Therefore, the gap difference between the central and peripheral parts of the display area is decreased, thereby uniformizing the gap over the whole display area. As a result, the gap difference can be limited within the range wherein the range where no interference fringes occur, which means that poor display quality is not caused by the interference fringes, improving the display quality. If a low viscosity material is used for the first sealing member, this advantage of improved quality is enhanced.

On the other hand, because there is no need to use a high viscosity material for the first sealing member and to cure the first sealing member promptly not to be broken, the selectable range for materials available to the first sealing member is expanded. In other words, as a material for the first sealing member, a thermosetting resin which is lower in viscosity and longer in curing time than UV curing resins may be used. In particular, this is valuable because it enables addition of a variety of thermosetting resins to the material for the first sealing member. For example, a material with a less contamination property to liquid crystal is selectable according to the type of liquid crystal to be used. If a thermosetting resin is used for the first sealing member, no UV light is irradiated to the liquid crystal and alignment layers, which leads to an additional advantage that a high-quality LCD panel can be fabricated without using UV light.

Moreover, if a thermosetting resin is used for the first sealing member and a UV curing resin is used for the second sealing member, the curing times for the first and second sealing members can be easily separated from each other. This is due to the following reason.

Specifically, when UV light is irradiated to the coupled first and second substrates to thereby cure the second sealing member, the first sealing member is never cured. Contrarily, when heat is applied to the coupled first and second substrates to thereby cure the first sealing member, the second sealing member is never cured. Thus, the separation of the curing times for the first and second sealing members can be ensured easily.

Since the second sealing member is directly applied with the atmospheric pressure, Thus, to ensure a desired vacuum state in the coupled first and second substrates by the second sealing member, the second sealing member needs to have a resistance high enough for the pressure. On the other hand, it is preferred that the first sealing member is easily deformed to improve the gap uniformity and to shorten the gap uniformizing time. Therefore, if the material for the first sealing member is lower in viscosity than the material for the second sealing member, the required characteristics for the first and second sealing members can be enhanced without any difficulty.

The first sealing member is continuous to form a closed pattern without any inlet for liquid crystal injection and no blocking material is used for blocking or closing the inlet. Thus, stress concentration does not occur in the first sealing member, which leads to improvement of the breaking resistance of the first sealing member.

In summary, with the method of fabricating an LCD panel according to the first aspect of the invention, more uniform gap is formed in the whole display area and the display quality is enhanced. The contamination of liquid crystal due to the sealing material is suppressed or eliminated and the degradation of the liquid crystal and alignment layers induced by UV light irradiation is prevented. The gap uniformizing time is shortened and the mechanical strength of the first sealing member is increased.

According to a second aspect of the present invention, another method of fabricating an LCD panel is provided, which comprises the steps of:

(a) providing a first transparent substrate;

(b) providing a second transparent substrate;

(c) forming a first sealing member on the first transparent substrate to surround a display area;
the first sealing member being used for sealing a liquid crystal;
the first sealing member having a first closed pattern;

(d) forming a second sealing member on the first or second substrate to surround the first sealing member;
the second sealing member having a second closed pattern;

(e) dropping a liquid crystal on the first or second substrate in the display area;

(f) coupling the first and second substrates with each other to form a gap between the first and second substrates in a vacuum atmosphere, forming a closed inner space between the first and second substrates by the first and second sealing members;
the liquid crystal being confined in the inner space;

(g) curing the second sealing member after the step (f);

(h) keeping the coupled first and second substrates in an atmosphere that uniformizes the gap between the coupled first and second substrates after the step (h); and (i) curing the first sealing member after the step (h).

With the method fabricating an LCD panel according to the second aspect, the step (h) is additionally provided to the method according to the first aspect. Thus, because of substantially the same reason as explained in the method of the first aspect, there are the same advantages as those in the method of the first aspect.

In a preferred embodiment of the method according to the first or second aspect of the invention, the step (h) of curing the first sealing member is performed in a period ranging from 5 minutes to 120 minutes after the step (g) of curing the second sealing member is completed. If the period is less than 5 minutes, the obtainable gap uniformity is insufficient. If the period is greater than 120 minutes, the productivity is lowered, which is not practical.

In another preferred embodiment of the method according to the first or second aspect of the invention, the first sealing member is made of a thermosetting resin.

In still another preferred embodiment of the method according to the first or second aspect of the invention, the first sealing member is made of a thermosetting resin and the second sealing member is made of a UV curing resin.

According to a third aspect of the present invention, a still another method of fabricating an LCD panel is provided, which comprises the steps of:

(a) providing a first transparent substrate;

(b) providing a second transparent substrate;

(c) forming a first sealing member on the first transparent substrate to surround a display area;
the first sealing member being made of a thermosetting resin;
the first sealing member being used for sealing a liquid crystal;
the first sealing member having a first closed pattern;

(d) forming a second sealing member on the first or second substrate to surround the first sealing member;
the second sealing member being made of a UV curing resin;
the second sealing member having a second closed pattern;

(e) dropping a liquid crystal on the first or second substrate in the display area;

(f) coupling the first and second substrates with each other to form a gap between the first and second substrates in a vacuum atmosphere, forming a closed inner space between the first and second substrates by the first and second sealing members;
the liquid crystal being confined in the inner space;

(g) curing the second sealing member after the step (f); and (h) curing the first sealing member after the step (f).

The steps (g) and (h) are performed at different times from each other.

With the method fabricating an LCD panel according to the third aspect, the first sealing member is made of a thermosetting resin while the second sealing member is made of a UV curing resin. The other steps are substantially the same as the method of the first aspect. Thus, because of substantially the same reason as explained in the method of the first aspect, there are the same advantages as those in the method of the first aspect.

In a preferred embodiment of the method according to the first or second or third aspect of the invention, a material for the first sealing member is lower in viscosity than a material fort the second sealing member.

In another preferred embodiment of the method according to the first or second or third aspect of the invention, a material for the first sealing member has a viscosity in a range from 1,000 $N·s/m^2$ to 10,000 $N·s/m^2$. If the viscosity of the material for the first sealing member is less than 1,000 $N·s/M^2$, the uncured first sealing member has an insufficient resistance against the applied pressure. If the viscosity of the material for the first sealing member is greater than 10,000 $N·s\ m^2$, the gap uniformity is insufficient and the time for gap uniformization is too long.

In still another preferred embodiment of the method according to the first or second or third aspect of the invention, a material for the second sealing member has a viscosity in a range from 6,000 $N·s/m^2$ to 100,000 $N·s/m^2$. If the viscosity of the material for the second sealing member is less than 6,000 $N·s/m^2$, the uncured second sealing member has an insufficient resistance against the applied pressure. If the viscosity of the material for the second sealing member is greater than 100,000 $N·s/m^2$, the second sealing member is difficult to have the second closed pattern as desired.

In a further preferred embodiment of the method according to the first or second or third aspect of the invention, a material for the first sealing member has a viscosity in a range from 1,000 $N·s/m^2$ to 10,000 $N·s/m^2$ and a material for the second sealing member has a viscosity in a range from 6,000 $N·s/m^2$ to 100,000 $N·s/m^2$.

According to a fourth aspect of the present invention, an LCD panel is provided, which comprises:

(a) a first transparent substrate;

(b) a second transparent substrate coupled with the first substrate to form a gap between the first and second substrates;
a closed inner space being formed between the first and second substrates by a sealing member;
the sealing member being formed to surround a display area;
the sealing member having a closed pattern; and (c) a liquid crystal layer formed in the inner space between the first or second substrate.

The gap has a value in a periphery of the display area and a value at a center of the display area, where the values have a difference within a limit for causing no interference fringe.

With the LCD panel according to the fourth aspect of the present invention, the sealing member is formed to surround the display area and has the closed pattern and therefore, no stress concentration occurs in or near the member. Thus, the resistance of the member against the applied pressure is enhanced.

Also, the sealing member is made of a thermosetting resin, it has a less contamination property to the liquid crystal layer and at the same time, the liquid crystal layer and alignment layers are not affected badly by UV light.

Since the values of the gap in the periphery of the display area and at the center of the display area have a difference within a limit for causing no interference fringe, high display quality is realized over the whole display area.

According to a fifth aspect of the present invention, another LCD panel is provided, which comprises:

(a) a first transparent substrate;

(b) a second transparent substrate coupled with the first substrate to form a gap between the first and second substrates;
a closed inner space being formed between the first and second substrates by a sealing member;
the sealing member being formed to surround a display area;
the sealing member being made of a thermosetting resin;
the sealing member having a closed pattern; and (c) a liquid crystal layer formed in the inner space between the first or second substrate.

The gap has a value in a periphery of the display area and a value at a center of the display area, where the values have a difference within a limit for causing no interference fringe.

With the LCD panel according to the fifth aspect of the present invention, because of the same reason as the panel according to the fourth aspect, there are the same advantages as those in the panel of the fourth aspect.

BRIEF DESCRIPTION OF THE DRAWINGS

In order that the present Invention may be readily carried into effect, it will flow be described with reference to the accompanying drawings.

FIG. 3 is a flowchart showing the process steps of a second prior-art method of fabricating an LCD panel, which includes the liquid crystal dropping process

FIG. 7 is a flowchart showing the process steps of a method of fabricating an LCD panel according to an embodiment of the invention.

DETAILED DESCRIPTION OF THE PREFERRED EMBODIMENTS

Figure 1:
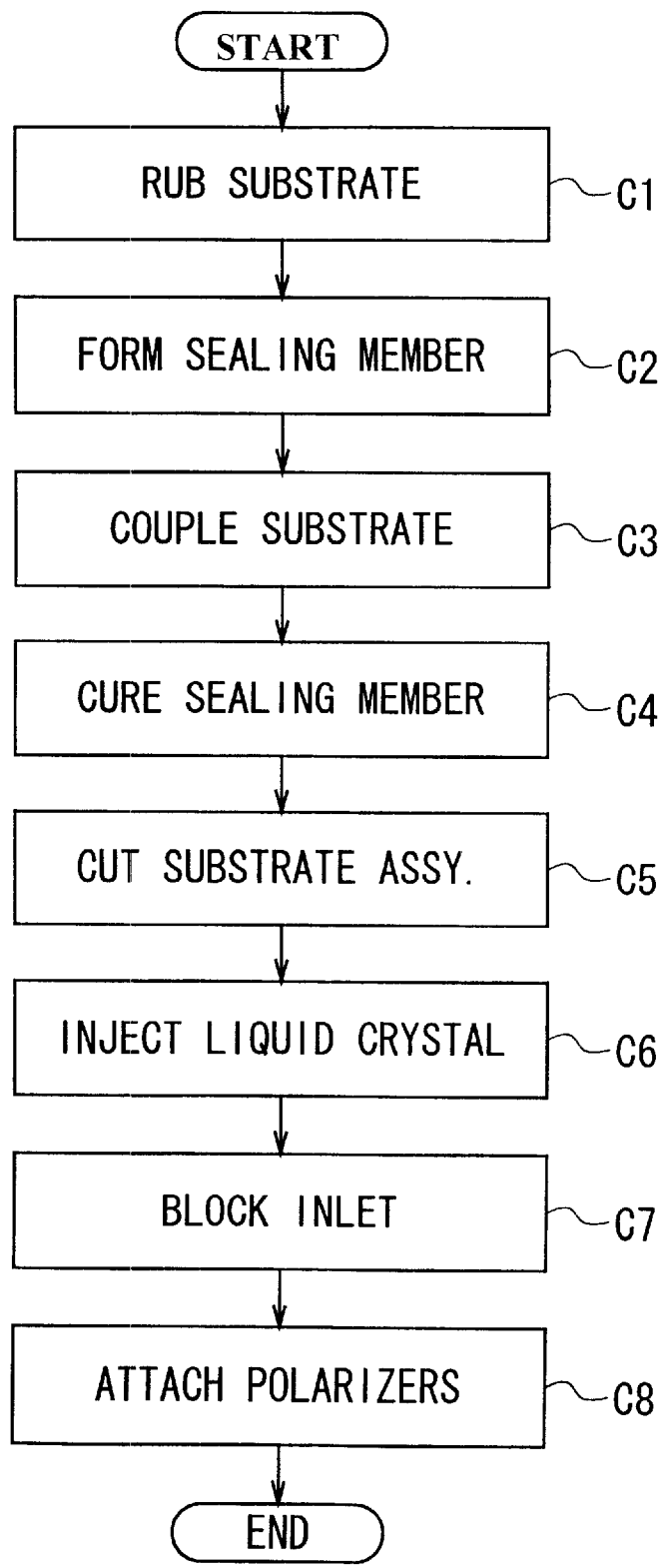
FIG. 1 is a flowchart showing the process steps of a first prior-art method of fabricating an LCD panel, which includes the liquid crystal dipping process.
Figure 2A:
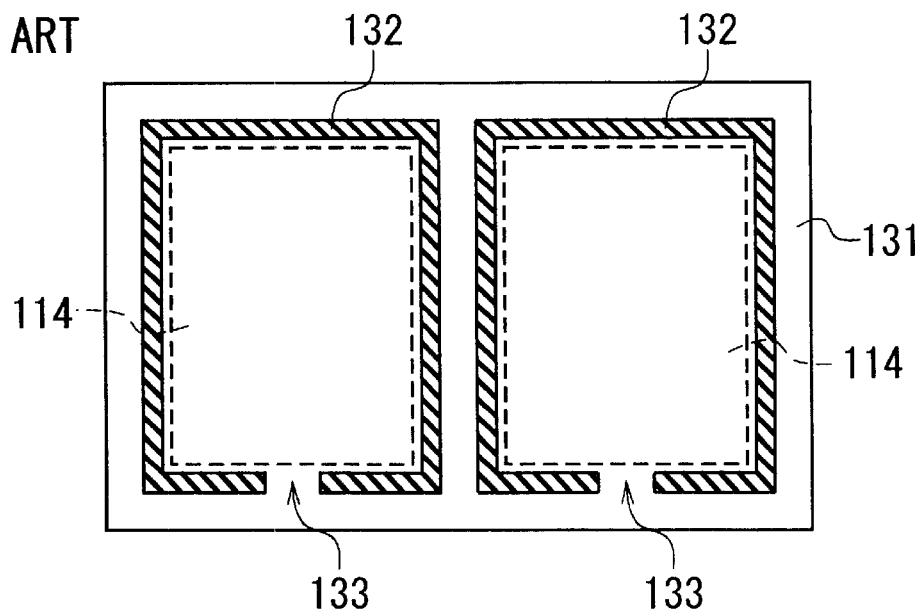
FIG. 2A is a schematic plan view showing the lower transparent substrate, on which the sealing members are formed in the process C2 of the flowchart in FIG. 1.
Figure 2B:
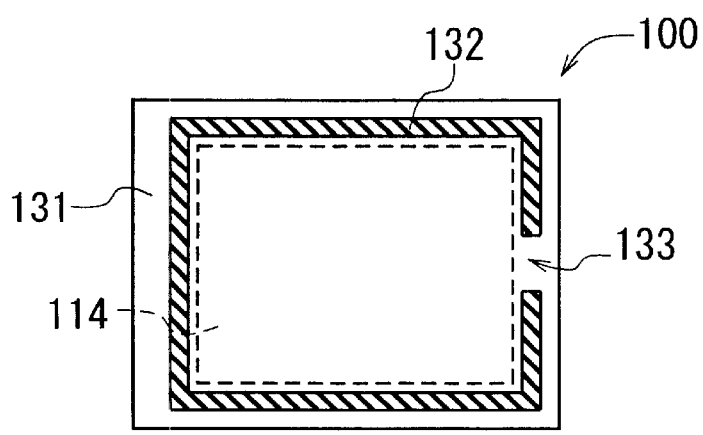
FIG. 2B is a schematic cross-sectional view along the line parallel to the lower and upper substrates showing the structure of the panel cut in the process C5 of the flowchart in FIG. 1, where the liquid crystal is not injected into the space yet.
Figure 2C:
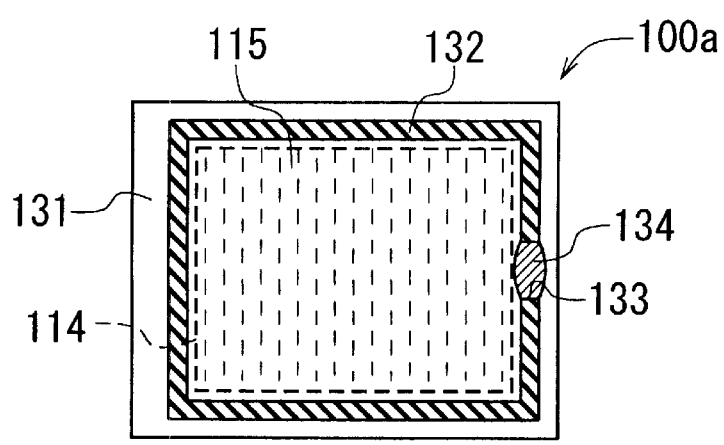
FIG. 2C is a schematic cross-sectional view along the line parallel to the lower and upper substrates showing the structure of the panel in the process C7 of the flowchart in FIG. 1, where the liquid crystal inlet is blocked by the blocking member.
Figure 4A:
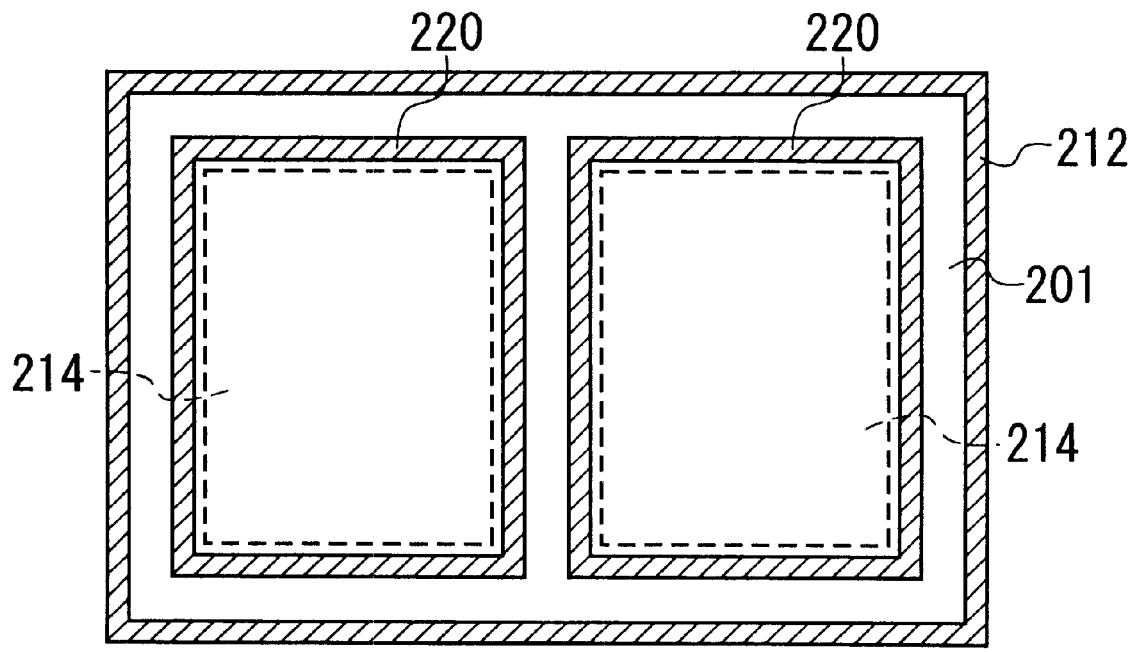
FIG. 4A is a schematic plan view showing the lower transparent substrate, on which the primary and secondary sealing members are formed in the process B2 of the flowchart in FIG. 3.
Figure 4B:
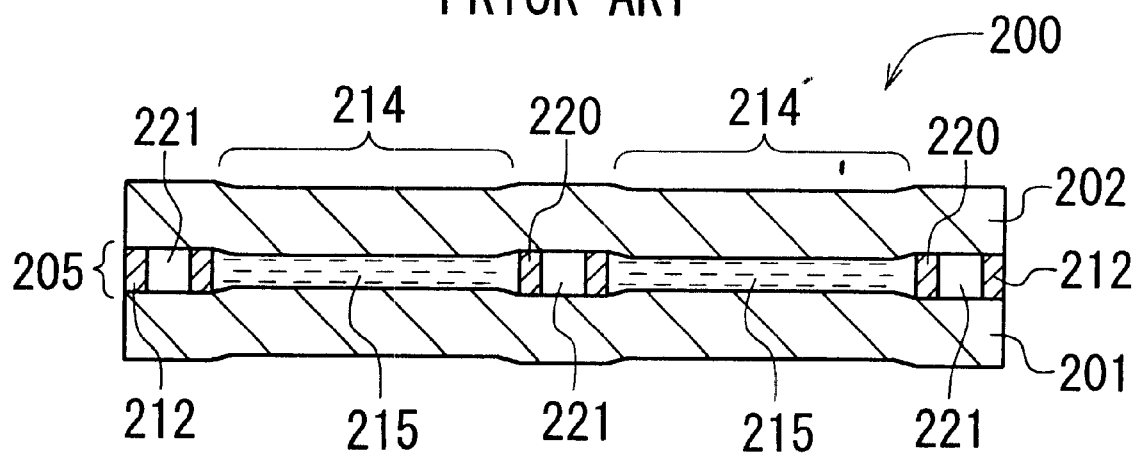
FIG. 4B is a schematic cross-sectional view along the line perpendicular to the lower and upper substrates showing the structure of the panel after the gap is uniformed in the process B5 of the flowchart in FIG. 3, where the liquid crystal has been filled into the space.
Figure 5A:
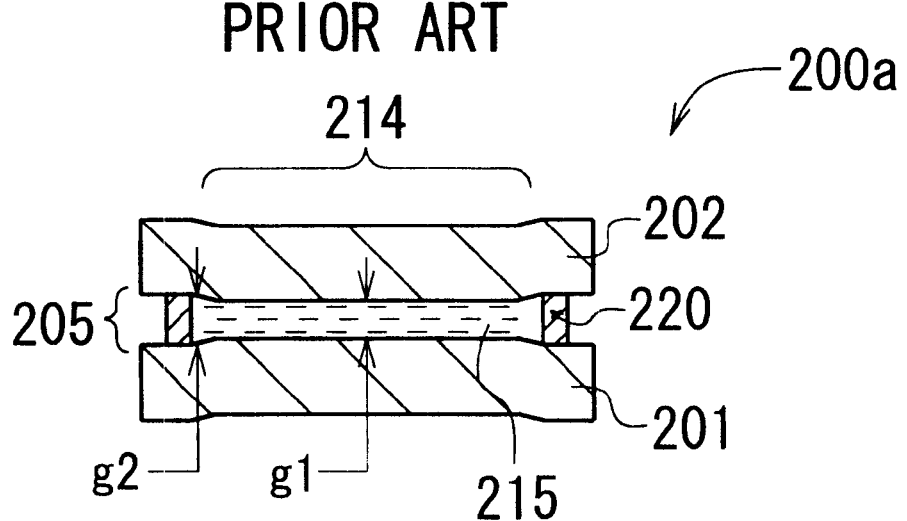
FIG. 5A is a schematic cross-sectional view along tile line perpendicular to the lower and upper substrates showing the structure of the panel cut in the process B6 of the flowchart in FIG. 3, where the gap g1 is less than the gap g2.
Figure 5B:
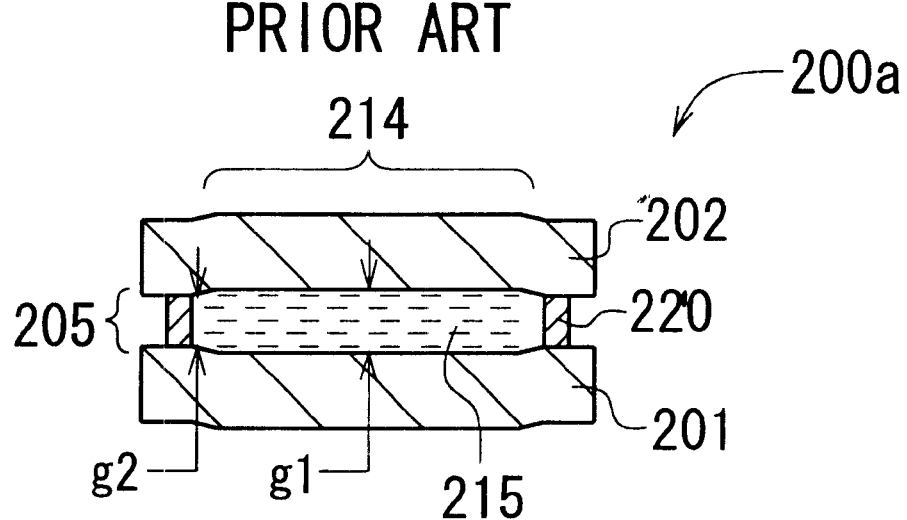
FIG. 5B is a schematic cross-sectional view along the line perpendicular to the lower and upper substrates showing the structure of the panel cut in the process B6 of the flowchart in FIG. 3, where the gap g1 is greater than the gap g2.
Figure 6:
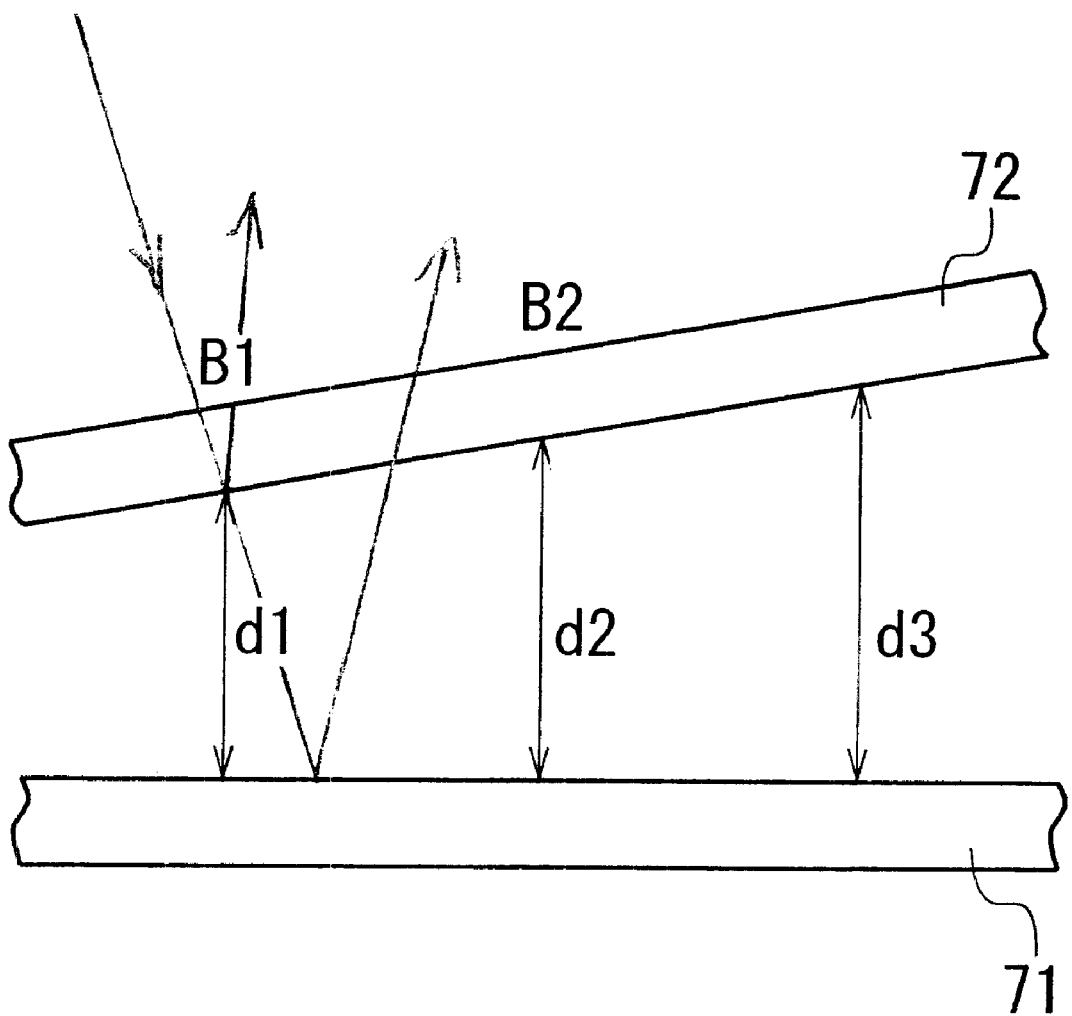
FIG. 6 is an enlarged, partial cross-sectional of a pair of opposing transparent substrates, which shows the principle of the interference fringes.

Preferred embodiments of the present invention will be described in detail below while referring to the drawings attached.

A method of fabricating an LCD panel according to an embodiment of the invention comprises the steps as shown by the flowchart in FIG. 7.

Figure 8A:
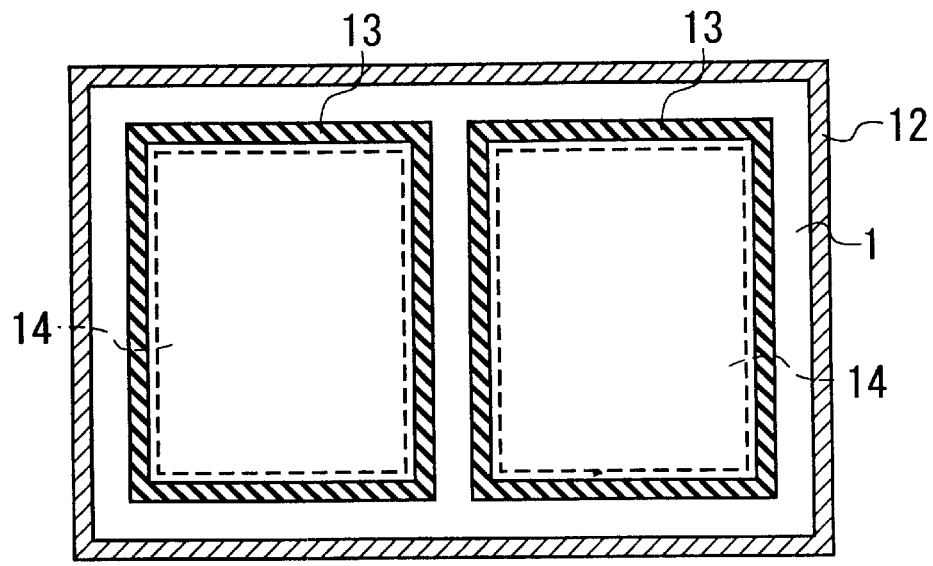
FIG. 8A is a schematic plan view showing the lower transparent substrate, on which the primary and secondary sealing members are formed in the process A2 of the flowchart in FIG. 7.
Figure 8B:
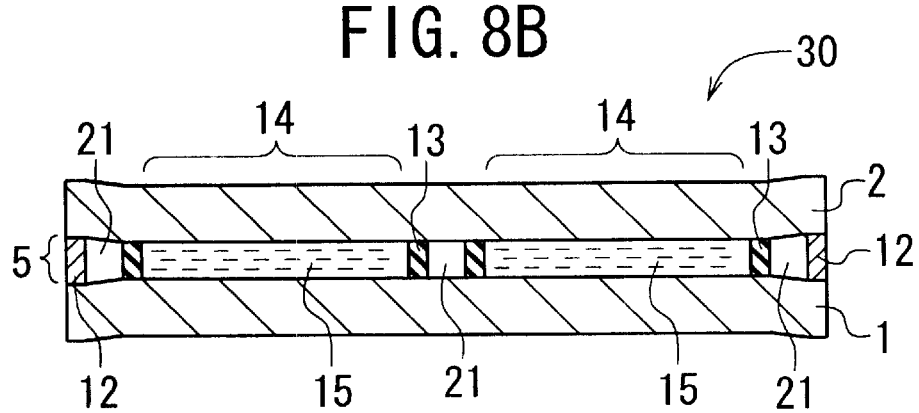
FIG. 8B is a schematic cross-sectional view along the line perpendicular to the lower and upper substrates showing the structure of the panel after the gap is uniformized in the process A5 of the flowchart in FIG. 7.

In the pre-process A0, a pair of transparent substrates 1 and 2 for the LCD panel are prepared, as shown in FIG. 8B. The substrates 1 and 2 are typically made of transparent glass. On the substrate 1 (i.e., the lower substrate), necessary parts and elements such as active elements (e.g., TFTS), data lines, and scan lines, are provided. On the other substrate 2 (i.e., the upper substrate), a color filter layer and other necessary parts are formed. An alignment layer (e.g., polyimide resin, not shown) is formed on the inner surface of each of the lower and upper substrates 1 and 2.

In the rubbing process A1 after the pre-process A0, the alignment layers on the lower and upper substrates 1 and 2 are rubbed with a buff wrapped around the rotatable roller in specific directions. Thus, minute grooves are formed on the surface of each alignment layer.

In the sealing member formation process A2 after the rubbing process A1, as shown in FIG. 8A, two primary sealing members 13 and a secondary sealing member 12 are formed on the lower substrate 1. Each of the primary sealing members 13 has a pattern of a rectangular closed curve without any opening, in other words, the member 13 extends around the periphery of the display area 14. The secondary sealing member 12 has a pattern of a rectangular closed curve as well. The primary members 13 are formed on the lower substrate 1 to be apart from each other at a specific distance. The secondary sealing member 12 is formed to surround the two primary members 13 at a specific distance. In other words, the member 12 is formed to involve the primary members 13 and to extend along the periphery of the substrate 1. The primary members 13 may be formed on the lower substrate 1 while the secondary member 12 may be formed on the upper substrate 2, and vice versa.

Each of the primary sealing members 13 is used for the LCD panel. Each of the primary members 13 and the secondary sealing member 12 is continuously written to draw a rectangular frame on the lower substrate 1 by dispensing proper materials for the sealing members 13 and 12 from the nozzle of a known dispenser. Unlike the first prior-art method shown in FIG. 1, no inlet for injecting liquid crystal is provided in the primary sealing members 13. Needless to say, the members 13 and 12 may be formed by the known screen printing method.

A proper epoxy-system thermosetting resin is used for the primary members 13. A proper acrylic-system UV-curing resin is used for the secondary member 12. The material for the members 13 is lower in viscosity than the material for the member 12. Preferably, the material for the primary members 13 has a viscosity in the range from 1,000 N·s/m$^2$ to 10,000 N·s/m$^2$ while the material for the secondary member 12 has a viscosity in the range from 6,000 N·s/m$^2$ to 100,000 N·s/m$^2$.

In the liquid crystal dispensing and substrate coupling process A3 after the sealing member forming process A2, a liquid crystal is dispensed on the lower substrate 1 prior to coupling the substrates 1 and 2.

The assembly apparatus used for this process A3 comprises typically a pressuring mechanism and an evacuating mechanism.

The pressuring mechanism includes an upper surface plate movable vertically and a lower surface plate movable horizontally. When the assembly of the lower and upper substrates is located between the lower and upper surface plates, it may be applied with a pressure as desired. The lower plate is larger in size than the upper plate and thus, the peripheral area of the lower plate protrudes from the upper plate when the upper plate is placed on the lower plate.

The evacuating mechanism has a lid formed by a top wall and a side wall extending along the periphery of the top wall, forming an inner space. The bottom of the lid is open. The upper surface plate of the pressuring mechanism is located in the inner space of the lid. When the lid along with the upper surface plate is lowered toward the lower surface plate of the pressuring mechanism until the opening lower end of the lid contacts closely the protruding periphery of the lower surface plate, a closed space is formed in the lid. The closed space, which is sandwiched by the lower and upper surface plates in the lid, communicates with a pumping system by way of tubes.

The upper surface plate is movable vertically with respect to the lid and therefore, the distance between the upper and lower surface plates is changeable. Thus, the pressure applied to the substrate assembly in the closed space is adjustable minutely.

The liquid crystal dispensing and substrate coupling process A3 is carried out in the following way using the above-described assembly apparatus. In the following explanation, FIG. 8B is referred.

First, the upper substrate 2 is attached to the upper surface plate of the assembly apparatus by suction while the lower substrate 1 is attached to the lower surface plate thereof by suction. Next, a liquid crystal is dropped in the display areas 14 of the lower substrate 1 which is surrounded by the respective primary sealing members 13.

Thereafter, the lower plate is slid to the position just below the upper plate and aligned thereto. The upper plate is lowered to be overlaid on the lower substrate 1 and then, the lid is lowered, contacting closely the bottom end of the lid with the periphery of the lower plate. Thus, the closed space is formed between the upper and lower plates.

Following this, the air existing in the closed space thus formed is evacuated by the evacuating mechanism, forming a vacuum atmosphere that surrounds the lower and upper substrates 1 and 2. The pressing force of the upper plate to the lower plate is raised to apply a pressure to the upper substrate 2. Thus, the gap 5 between the lower and upper substrate 1 and 2 is minutely adjusted as desired.

Through the above-described processes, the lower substrate 1 is coupled with the upper substrate 2 by way of the primary and secondary sealing members 13 and 12, forming a liquid crystal layer 15 in the gap 5. In other words, a LCD panel assembly 30 comprising the lower and upper substrates 1 and 2, the sealing members 13 and 12, and the liquid crystal layer 1D is produced. The state at this stage is shown in FIG. 8B.

Subsequently, the applied pressure to the upper plate is removed and then, the lower plate on which the LCD panel assembly 30 is placed is slid outwardly from the overlaying position. The assembly 30 is subjected to a diselectrification process and then, taken out of the assembly apparatus and sent to the subsequent sealing member curing process A4.

In the secondary sealing member curing process A4, the secondary sealing member 12 is cured by irradiating specific UV light to the member 12. This process is performed immediately after the space that surrounds the LCD panel assembly 30 has been released to the atmospheric pressure.

To perform this process, the TCD panel assembly 30 is taken out of the assembly apparatus and then transferred to a UV irradiation apparatus, in which UV light is irradiated to the assembly 30. In this case, it will take several minutes for the secondary sealing member 12 to cure completely after the assembly 30 has been subjected to the atmospheric pressure.

Alternately, a UV irradiation apparatus may be built in the assembly apparatus. In this case, after the lower and upper substrates 1 and 2 are coupled together, UV light is irradiated to the secondary sealing member 12 in the vacuum atmosphere prior to the release to the atmospheric pressure. There is an additional advantage that the closed space 21 can be kept in a high vacuum state.

Next, the gap uniformizing process A5 is carried out. The uniformization of the gap 5 between the lower and upper substrates 1 and 2 coupled together progresses due to the pressing force caused by the difference between the atmospheric pressure applied to the outer surfaces of the LCL) panel assembly 30 and the inner pressure thereof. Specifically, due to the deformation of the lower and upper substrate 1 and 2 and the deformation of the liquid crystal layer 15 in the gap 5, the gap 5 is uniformized gradually. If spacer particles are dispersed in the gap 5, the particles are deformed by the pressing force as well, resulting in the gap 5 being uniformized.

In the process A5, the primary sealing members 13 are uncured and the material for the secondary sealing member 12 is low in viscosity and therefore, the members 13 are sandwiched by the lower and upper substrate 1 and 2 with pressure. Thus, the members 13 deform sufficiently according to the deformation of the substrates 1 and 2. This means that the gap 5 is uniformized not only in the central part of the display area 14 but also the periphery of the area 14 at approximately the same level. As a result, the value of the gap 5 in the periphery of the area 14 and the value at the central part of the area 14 have a difference within the limit for causing no interference fringe. In particular, the fact that the material for the first sealing members 13 is lower in viscosity than the material for the secondary sealing member 12 contributes the decrease of the time required for gap uniformization.

Additionally, in the gap uniformizing process, the vacuum space 21 formed by the primary sealing members 13 and the secondary sealing member 12 between the substrates 1 and 2 keeps the pressure difference from the atmospheric pressure even after the pressure difference between the liquid crystal layer 15 and the atmospheric pressure decreases. As a result, the gap uniformization can be realized at high level. Therefore, after the panel assembly 30 is left in the atmospheric pressure, the uniformizing process A5 of the gap 5 continues until the pressing force generated by the atmospheric pressure balances the stress of the LCD panel assembly 30.

If the primary and secondary sealing members 13 and 12 are left uncured after the LCD panel assembly 30 is left in the atmospheric pressure, the secondary sealing member 12 tends to break. In this case, the vacuum space 21 tends to disappear and as a result, the gap uniformization does not progress at desired high level. At the same time, due to the break of the secondary sealing member 12, there is a danger that the atmospheric pressure applies directly to the primary sealing members 13, resulting in the assembly 30 itself being broken. However, in the method according to the embodiment, the time to start the curing process is set immediately after the space that surrounds the assembly 30 has been released to the atmospheric pressure. Thus, there is no danger that the assembly 30 itself is broken.

After the gap uniformizing process A5, the main sealing member curing process A6 is performed in a time ranging from 5 minutes to 120 minutes.

In the process A6, the panel assembly 30 is heated or sintered to cure the primary sealing members 13. It is ideal that the main sealing members 13 are kept uncured in the gap uniformizing process A5 and that the curing of the members 13 is completed immediately after the gap uniformizing process A5 is finished. If the heating time is shorter than 5 minutes, the gap uniformizing time is insufficient. If the heating time is longer than 120 minutes, the productivity is lowered. As a result, it is practical that a thermosetting resin having a curing time of approximately 30 minutes to 120 minutes at a temperature of 70° C. to 150° C. is used.

Since the primary sealing members 13 are made of a thermosetting resin, it takes several tens minutes to cure the members 13. However, in the process A6, the members 13 are surrounded by the secondary sealing member 12 that has been already cured and that is not broken by the atmospheric pressure. That is, the members 13 are protected by the member 12 from the atmospheric pressure. Accordingly, there is an additional advantage that the heating time for the primary members 13 can be set considerably long without anxiety about the members 13 being broken by the atmospheric pressure.

For example, the secondary member 12 is cured in 5 minutes after the panel assembly 30 is subjected to the atmospheric pressure the curing of the primary members 13 is started at the time 50 minutes after the curing of the member 12is completed. The heating time for the members 13 is set at 30 minutes. In this case, the gap uniformizing process A5 is 55 minutes (=5+50 minutes). In this case, the 50 minutes includes the heating time of 30 minutes.

If the atmospheric pressure does not balance the stress of the assembly 30 yet after the primary members 13 is completely cured, the gap uniformization progresses even after the primary members 13 are cured. In other words, part of the gap uniformizing process A5 may be placed after the primary sealing member curing process A6. To enhance the gap uniformity and to shorten the time for the gap uniformizing process A5, it is preferred to increase the time for the gap uniformizing process A5 that is carried out while the members 13 are uncured.

Figure 8C:
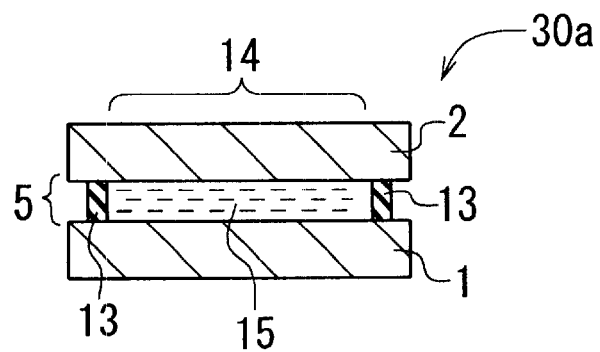
FIG. 8C is a schematic cross-sectional view along the line perpendicular to the lower and upper substrates showing the structure of the panel cut in the process A7 of the flowchart in FIG. 7.

After the primary sealing member curing process A6, the substrate cutting process A7 is performed. In this process, the panel assembly 30 is cut to divide it into LCD panels 30a. The cutting operation of the assembly 30 is performed along the cutting line that surrounds each primary sealing member 13, forming a rectangular-ring-shaped specific area outside the display area 14 in each panel 30a. The panel 30a thus divided is shown in FIG. 8C. Thus, the LCD panel 30a is produced.

After the substrate cutting process A7, the polarizer plate attaching process A8 is carried out. In this process, a polarizer plate (not shown) is attached to the outer surface of each of the lower and upper substrate 1 and 2 of the panel 30a. The polarizer plate is provided to allow the component of light whose plane of polarization is in a specific direction to selectively pass through the plates on the two substrates are fixed in such a way that their polarization directions are perpendicular.

Through the above-described process steps, the LCD panel 30a is completed. As seen from the above explanation, the liquid crystal injection and inlet blocking processes are unnecessary and thus, there is an advantage that the overall process time is decreased compared with the method using the liquid crystal injection process.

With the method of fabricating a LCD panel according to the embodiment of the invention using the liquid crystal dispensing process, the material for the primary sealing members 13 is a thermosetting resin with a viscosity in a range from 1,000 N·s/m$^2$ to 10,000 N·s/m$^2$₁ which is lower than the viscosity of the material for the secondary sealing member 12. The member 12 is cured immediately after the member 12 is subjected to the atmospheric pressure and then, the primary members 13 are cured in the time from 5 minutes to 120 minutes.

Therefore, the deformation of the primary sealing members 13 follow sufficiently the deformation of the lower and upper substrates 1 and 2 and thus, it is not limited by the height of the members 13. This means that the dimensional difference occurring between the gap 5 in the periphery of the display area 14 (i.e., the vicinity of the primary sealing members 13) and the gap 5 at the center of the area 14 decreases. As a result, the gap 5 is substantially uniform in the entire area 14, in other words, the difference of the gap 5 in the a periphery of the area 14 and at the center of the area 14 is within the limit for causing no interference fringe. This leads to high or excellent display quality.

Since the primary sealing members 13 are made of a thermosetting resin, the contamination to the liquid crystal layer 15 is decreased and the degradation of the layer 15 and the alignment layers due to UV light irradiation is prevented Because of the above-identified viscosity of the members 13, the time required for the gap uniformizing process is shortened.

As the material for the secondary sealing member 12, any material with a viscosity ranging from 6,000 N·s/m$^2$ to 100,000 N·s/m$^2$ may be used. The material for the member 12 is not limited to a UV curing resin if it can be cured before the primary sealing members 13 are cured.

With the method according to the embodiment of the invention, the material for the primary sealing members 13 is a thermosetting resin with a viscosity ranging from 1,000 N·s/m$^2$ to 10,000 N·s/m$^2$, which is lower than the viscosity of the material for the secondary sealing member 12. The material for the member 12 is a UV curing resin with a viscosity ranging from 6,000 N·s/m$^2$ to 100,000 N·s/m$^2$. These setting on the viscosity is determined or selected have the technical significance described below.

With the primary sealing members 13, the gap uniformity needs to be raised and the gap uniformizing time needs to be shortened. In other words, the viscosity of the material for the members 13 is determined in such a way that the gap uniformity level is high enough for preventing the interference fringes and that the gap uniformizing time is shortened as much as possible. Thus, it is not practical to use a material with a viscosity greater than 10,000 N·s/m$^2$ for the members 13.

To uniformize the gap 5, it is preferred that the viscosity of the material for the members 13 is as low as possible. However, the lowest viscosity is determined due to the following reason.

Specifically, after the substrate coupling process A3, the coupled substrates 1 and 2 are subjected to the atmospheric pressure and thus, the liquid crystal layer 15 is expanded. The gap uniformizing process is carried out while the layer 15 is surrounded by the primary members 13. At this time, due to the pressure difference between the vacuum space 21 and the layer 15, the members 13 are kept to be applied with a pressure directing from the layer 15 to the space 21. Thus, the members 13 need to have a viscosity that withstands this pressure. It is not practical to use a material with a viscosity less than 1,000 N·s/m² for the members 13.

On the other hand, the material for the secondary sealing member 12 has a viscosity that withstands the vacuum atmosphere during the time from the exposure to the atmospheric pressure to the curing of the member 12. Thus, it is practical to use a material with a viscosity greater than 6,000 N·s/m² for the member 12.

To keep the vacuum state, it is preferred that the viscosity of the material for the secondary member 12 is as high as possible. However, if it is excessively high, the member 12 is difficult or unable to be written as desired by using a dispenser. To make it possible to draw a desired pattern with the material with a dispenser of this type, it is not practical to use a material with a viscosity greater than 100,000 N·s/m² for the member 12. If the screen printing method is used for this purpose, the viscosity needs to be lowered further. Thus, it is practical that the viscosity of the material for the member 12 is equal to or less than 100,000 N·s/m².

Since the secondary member 12 needs to keep the vacuum atmosphere, the material for the member 12 needs to have as a high viscosity as possible. However, it is preferred that the material for the member 13 has a lower viscosity than the material for the member 12 to facilitate the gap uniformization. Because of the above-described technical significance, in the method according to the embodiment of the invention, the viscosity of the material for the primary members 13 is set to be lower than the material for the secondary member 12. Also, the viscosity of the material for the member 13 is in the range from 1,000 N·s/m² to 10,000 N·s/m² and at the same time, the viscosity or the material for the member 12 is in the range from 6,000 N·s/m² to 100,000 N·s/m².

Any epoxy-system thermosetting resin may be used if it has a viscosity from 1,000 N·s/m² to 10,000 N·s/m². Any acrylic-system UV curing resin may be used if it has a viscosity from 6,000 N·s/mr to 100,000 N·s/m². However, the invention is not limited to these materials.

While the preferred form of the present invention has been described, it is to be understood that modifications will be apparent to those skilled in the art without departing from the spirit of the invention. The scope of the present invention, therefore, is to be determined solely by the following claims.

What is claimed is:

1. A method of fabricating a LCD panel, comprising:
providing a first transparent substrate;
providing a second transparent substrate;
forming a first sealing member on the first transparent substrate to surround a display area, the first sealing member being used for sealing a liquid crystal and the first sealing member having a first closed pattern;
forming a second sealing member on the first transparent substrate or the second transparent substrate, the second sealing member having a second closed pattern which is larger than said first pattern;
dropping a liquid crystal on the first transparent substrate or the second transparent substrate in the display area;
coupling the first transparent substrate and the second transparent substrate with each other to form a uniform gap between the first and second transparent substrates in a vacuum atmosphere, forming a closed inner space between the first transparent substrate and the second transparent substrate by the first sealing member and the second sealing member, the liquid crystal being confined in the inner space;
curing the second sealing member; and
after said curing of said second sealing member, curing the first sealing member.

2. The method according to claim 1, wherein curing the first sealing member is performed in a period ranging from 5 minutes to 120 minutes after curing the second sealing member is completed.

3. The method according to claim 1, wherein the first sealing member is made of a thermosetting resin.

4. The method according to claim 1, wherein the first sealing member is made of a thermosetting resin and the second sealing member is made of a UV curing resin.

5. The method according to claim 1, wherein a material for the first sealing member is lower in viscosity than a material for the second sealing member.

6. The method according to claim 1, wherein a material for the first sealing member has a viscosity in a range from 1,000 N·s/m² to 10,000 N·s/m².

7. The method according to claim 1, wherein a material for the second sealing member has a viscosity in a range from 6,000 N·s/m² to 100,000 N·s/m².

8. The method according to claim 1, wherein a material for the first sealing member has a viscosity in a range from 1,000 N·s/m² to 10,000 N·s/m² and a material for the second sealing member has a viscosity in a range from 6,000 N·s/m² to 100,000 N·s/m².

9. A method of fabricating a LCD panel, comprising:
providing a first transparent substrate;
providing a second transparent substrate;
forming a first sealing member on the first transparent substrate to surround a display area, the first sealing member being used for sealing a liquid crystal, and the first sealing member having a first closed pattern;
forming a second sealing member on the first transparent substrate or the second transparent substrate, the second sealing member having a second closed pattern which is larger than said first pattern;
dropping a liquid crystal on the first transparent substrate or the second transparent substrate in the display area;
coupling the first and second transparent substrates with each other to form a uniform gap between the first and second transparent substrates in a vacuum atmosphere, forming a closed inner space between the first and second transparent substrates by the first and second sealing members, the liquid crystal being confined in the inner space;
curing the second sealing member;
keeping the coupled first and second transparent substrates in an atmosphere that uniformizes the gap between the coupled first and second transparent substrates; and
after said curing said second sealing member, curing the first sealing member.

10. The method according to claim 9, wherein the curing of the first sealing member is performed in a period ranging from 5 minutes to 120 minutes after curing the second sealing member is completed.

11. The method according to claim 9, wherein the first sealing member is made of a thermosetting resin.

12. The method according to claim 9, wherein the first sealing member is made of a thermosetting resin and the second sealing member is made of a UV curing resin.

13. The method according to claim 9, wherein a material for the first sealing member is lower in viscosity than a material for the second sealing member.

14. The method according to claim 9, wherein a material for the first sealing member has a viscosity in a range from 1,000 N·s/m$^2$ to 10,000 N·s/m$^2$.

15. The method according to claim 9, wherein a material for the second sealing member has a viscosity in a range from 6,000 N·s/m$^2$ to 100,000 N·s/m$^2$.

16. The method according to claim 9, wherein a material for the first sealing member has a viscosity in a range from 1,000 N·s/m$^2$ to 10,000 N·s/m$^2$ and a material for the second sealing member has a viscosity in a range from 6,000 N·s/m$^2$ to 100,000 N·s/m$^2$.

17. A method of fabricating a LCD panel, comprising:

providing a first transparent substrate;

providing a second transparent substrate;

forming a first sealing member on the first transparent substrate to surround a display area, the first sealing member being made of a thermosetting resin, the first sealing member being used for sealing a liquid crystal, and the first sealing member having a first closed pattern;

forming a second sealing member on the first transparent substrate or the second transparent substrate, the second sealing member being made of a UV curing resin, the second sealing member having a second closed pattern;

dropping a liquid crystal on the first transparent substrate or the second transparent substrate in the display area;

coupling the first and second transparent substrates with each other to form a uniform gap between the first and second transparent substrates in a vacuum atmosphere, forming a closed inner space between the first and second transparent substrates by the first and second sealing members, the liquid crystal being confined in the inner space;

curing the second sealing member; and after said curing of said second sealing member, curing the first sealing member.

18. The method according to claim 17, wherein a material for the first sealing member is lower in viscosity than a material for the second sealing member.

19. The method according to claim 17, wherein a material for the first sealing member has a viscosity in a range from 1,000 N·s/m$^2$ to 10,000 N·s/m$^2$.

20. The method according to claim 17, wherein a material for the second sealing member has a viscosity in a range from 6,000 N·s/m$^2$ to 100,000 N·s/m$^2$.

21. The method according to claim 17, wherein a material for the first sealing member has a viscosity in a range from 1,000 N·s/m$^2$ to 10,000 N·s/m$^2$ and a material for the second sealing member has a viscosity in a range from 6,000 N·s/m$^2$ to 100,000 N·s/m$^2$.

* * * * *